US00RE50847E

(19) United States
(12) Reissued Patent
Nguyen et al.

(10) Patent Number: US RE50,847 E
(45) **Date of Reissued Patent: *Mar. 31, 2026**

(54) MULTI-BOWL WELLHEAD ASSEMBLY AND METHOD OF COMPLETING A WELL

(71) Applicant: Vault Pressure Control LLC, Houston, TX (US)

(72) Inventors: Khang V. Nguyen, Houston, TX (US); Saurabh Kajaria, Houston, TX (US); Knox F. Wright, Houston, TX (US); Sheila A. Adkinson, Houston, TX (US)

(73) Assignee: VAULT PRESSURE CONTROL LLC, Houston, TX (US)

( * ) Notice: This patent is subject to a terminal disclaimer.

(21) Appl. No.: 16/238,842

(22) Filed: Jan. 3, 2019

Related U.S. Patent Documents

Reissue of:

(64) Patent No.: 9,534,465
Issued: Jan. 3, 2017
Appl. No.: 14/051,687
Filed: Oct. 11, 2013

U.S. Applications:

(60) Provisional application No. 61/720,834, filed on Oct. 31, 2012.

(51) Int. Cl.
*E21B 33/03* (2006.01)

(52) U.S. Cl.
CPC ..... *E21B 33/03* (2013.01)

(58) Field of Classification Search
CPC ..... E21B 33/03; E21B 33/038; E21B 33/035; E21B 33/0353; E21B 33/04; F16B 7/1472; F16L 25/065
(Continued)

(56) References Cited

U.S. PATENT DOCUMENTS 2,771,956 A * 11/1956 Johnson ..... E21B 33/04 166/88.3
3,606,393 A * 9/1971 Huntsinger ..... F16L 25/065 411/116
(Continued)

FOREIGN PATENT DOCUMENTS

WO WO8706645 * 11/1987 ..... F16L 37/56

OTHER PUBLICATIONS

Wood Group Pressure Control, Generic, Rig Setup Procedures, Publication No. RP-609 Rev 9, Dec. 28, 2005.
(Continued)

*Primary Examiner* — William C Doerrler
(74) *Attorney, Agent, or Firm* — Morgan, Lewis & Bockius LLP

(57) ABSTRACT

[A] *A wellbore system includes a hub and an annular locking member. The hub can be adapted to couple to a wellhead. The annular locking member can couple to an external diameter of a blowout preventer assembly. The annular locking member can include a plurality of locking elements configured to couple the annular locking member to the hub. Further a* method of completing a well includes lowering a wellhead onto a base at an upper end of the well. [A hub with internal threads and an external circumferential stepped recess is secured] *The method can include securing the hub* to external threads of the wellhead. [A] *The method further includes landing a* blowout preventer assembly with an annular locking member [having a plurality of locking elements is landed on the hub, and the locking elements are
(Continued)

engaged] *and engaging the annular locking member* with the recess of the hub. [The well is drilled] *The method further includes drilling* through the blowout preventer assembly [to a greater depth then] *and removing* the blowout preventer assembly and the hub [are removed]. [A threaded flange with a plurality of bolt holes spaced around the flange is secured to the external threads of the wellhead and] *Further,* a wellhead member is bolted to the bolt holes of the threaded flange.

37 Claims, 3 Drawing Sheets

(58) Field of Classification Search
USPC ..... 285/308, 309
See application file for complete search history.

(56) References Cited

U.S. PATENT DOCUMENTS 4,650,226 A * 3/1987 Babbitt ..... E21B 33/04 285/348
4,799,714 A * 1/1989 Collet ..... E21B 33/0422 285/308
5,257,792 A * 11/1993 Putch ..... E21B 33/0422 277/328
5,327,965 A * 7/1994 Stephen ..... E21B 33/04 166/182
6,199,914 B1 * 3/2001 Duhn ..... E21B 17/02 285/309
7,032,677 B2 * 4/2006 McGuire ..... E21B 33/038 166/85.4
7,779,921 B2 8/2010 Cain et al.
8,567,513 B2 * 10/2013 Lacheny ..... E21B 33/038 166/379
2009/0032241 A1 2/2009 Allen et al.
2009/0032265 A1 2/2009 Borak, Jr. et al. .... E21B 33/038 166/379
2012/0211233 A1 * 8/2012 Campello ..... E21B 17/00 166/344

OTHER PUBLICATIONS

International Search Report and Written Opinion issued in connection with corresponding PCT Application No. PCT/US2013/067657 on Sep. 4, 2014.

* cited by examiner

MULTI-BOWL WELLHEAD ASSEMBLY AND METHOD OF COMPLETING A WELL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application claims priority to and the benefit of U.S. Provisional Application Ser. No. 61/720,834, filed Oct. 31, 2012 the full disclosure of which is hereby incorporated by reference herein for all purposes.

BACKGROUND

1. Field of the Disclosure

This invention relates in general to wellheads having bowls for more than one casing hanger, and a method for installing the wellhead assembly.

2. Description of Prior Art

When drilling a well, after drilling to a first depth and installing a conductor pipe, a wellhead can be landed on the conductor pipe. Additional well operations can be performed through this wellhead during the drilling process. During such operations, it may be desirable to temporarily attach certain equipment or components to a top end of the wellhead. At certain times during the drilling process and related operations, it may be necessary or desirable to remove the equipment or components attached to the top of the wellhead. For example, if a easing string becomes stuck and needs to be cut within the wellhead, the equipment or components attached to the top of the wellhead can be removed to facilitate the cutting of the casing. Traditionally, the equipment or components attached to the top of the wellhead are connected to the wellhead with a bolted or threaded connection, making it time consuming to disconnect the equipment or components attached to the top of the wellhead from the wellhead.

After the drilling process and related operations are concluded and the well completion is being finalized, a wellhead member will be secured to the top of the wellhead which is expected to remain in place for the duration of production operations of the well. This more long term wellhead member is traditionally connected to the top of the wellhead with the same connection means as the temporary equipment or components used during drilling operations were attached to the top of the wellhead. However the preferred connection means for connecting the more long term wellhead member to the top of the wellhead may not be ideal for connecting the temporary equipment or components to the top end of the wellhead.

SUMMARY OF THE DISCLOSURE

Embodiments of the current disclosure provide a system and method for attaching temporary equipment or components to the wellhead that allows for easy and efficient disconnection, reconnection, or replacement during the drilling process. Embodiments of the current disclosure also allow for a safe and secure connection of a subsequent wellhead member to the wellhead in an alternative manner than what was used to connect the temporary equipment or components to the wellhead. Therefore, a single connection method does not need to be selected for the attachment of both temporary equipment or components and more long term subsequent wellhead members.

In an embodiment of the system and method of the present disclosure, a method of completing a well includes lowering a wellhead onto a base at an upper end of the well. The wellhead has external threads on an enter diameter. A hub with internal threads and an external circumferential stepped recess is secured to the external threads of the wellhead. A blowout preventer with an annular locking member having a plurality of locking elements is landed on the hub and the locking elements are engaged with the recess. The well is drilled through the blowout preventer assembly to a greater depth then the blowout preventer assembly and the hub are removed. A threaded flange with a plurality of bolt holes spaced around the flange is secured to the external threads of the wellhead and a wellhead member is bolted to the bolt holes of the threaded flange.

In certain embodiments, the base comprises a landing ring and before lowering the wellhead onto the base, the landing ring is secured to the upper end of the well. Before lowering the wellhead onto the base, a running loot with internal threads can be secured to the external threads of the wellhead and the wellhead can be lowered onto the base with the miming tool. The wellhead can be lowered through a riser.

In other embodiments, the wellhead can have an upper rim and the blowout preventer assembly can have a blow out preventer and quick connector spool located between the blowout preventer and the annular locking member. In such an embodiment, the quick connector spool is landed on the upper rim of the wellhead. The blow out preventer can be connected to the quick connect spool with bolts before landing the blow out preventer assembly on the hub. Alternatively, the blowout preventer can be bolted to the quick connect spool and the spool can be connected to the annular locking member before landing the blow out preventer assembly on the hub.

In yet other embodiments, an intermediate casing string can be run through the blowout preventer assembly and into the wellhead. If an upper end of the intermediate casing string protrudes above the wellhead when the casing siring can no longer be lowered into the well, the locking elements can be disengaged from the recess and the blowout preventer assembly can be removed. An upper end of the intermediate casing string can be cut within the wellhead and then the blowout preventer assembly can be returned to the hub and the locking elements can be engaged with the recess.

In alternative embodiments of the current disclosure, a method of completing a well includes providing a wellhead with a bore, a rim, and external threads on an outer diameter portion of the wellhead joining the rim. An upper end of a surface casing string is secured to the wellhead, and a running tool is scarred to the external threads. The wellhead is lowered onto a base at an upper end of the well and the surface casing string is cemented. A hub with internal threads and an external circumferential stepped recess is provided and after removal of the running tool the hub is secured to the external threads. A blowout preventer and an annular locking member having a plurality of locking elements are provided and the blowout preventer is bolted to the annular locking member to define a blowout preventer assembly. The blowout preventer assembly is landed on the hub and the locking elements are moved inward into engagement with the recess. The well is drilled through the blowout preventer assembly to a greater depth and at least one inner casing string is cemented in the well. The blowout preventer assembly and the hub are then removed and a threaded flange having bolt holes is secured to the external threads. A tubing head is bolted to the bolt holes of the threaded flange.

In certain embodiments, the wellhead is lowered onto a base with the funning tool through a riser. The riser can be before connecting the hub to the wellhead. The blowout preventer assembly can have a connector spool bolted between the blowout preventer and the annular locking member.

In other embodiments, a connector pipe is extended into the web and a riser is connected to the upper end of the connector pipe with a riser connector. A view port in the riser connector can be opened and it can be visually confirmed that the wellhead has properly landed on the base. Drilling can take place through die riser and the riser can be removed from the upper end of the well before the wellhead is provided. The locking elements can be threaded members that are moved inward into engagement with the recess by rotating the locking elements with a tool.

In another alternative embodiment of this disclosure, a riser is connected to an upper end of a conductor pipe that extends into the well with a riser connector. A wellhead with a support ring at its lower end is provided and lowered through the riser. The wellhead has external threads on an outer diameter. The support ring of the wellhead is landed on a landing ring located at an upper end of the conductor pipe. The riser is then removed. A hub with internal threads and an external circumferential stepped recess is secured to the external threads of the wellhead. A blowout preventer, a connector spool, and an annular locking member having a plurality of locking elements are provided. The blowout preventer is bolted to one end of the connector spool and the annular locking member is connected to an opposite end of the connector spool to define a blowout preventer assembly. The blowout preventer assembly is then landed on the hub, and the locking elements are engaged with the recess. The well is drilled through the blowout preventer assembly to a greater depth then the blowout preventer assembly and the hub are removed. A threaded flange having bolt holes is secured to the external threads of the wellhead and a wellhead member is bolted to the bolt holes of the threaded flange.

In certain embodiments when the support ring of the wellhead is landed on a landing ring, a view port in the riser connector can be opened and it can be visually confirmed that the support ring has properly landed on the landing ring. A running tool with internal threads can be secured to the external threads of the wellhead and the wellhead can be through the riser with the running tool. The running tool can be removed when the riser is removed. An intermediate casing string can be run through the blowout preventer assembly and into the wellhead. If an upper end of the intermediate casing string protrudes above the wellhead when the casing siring can no longer be lowered into the well, the locking elements can be disengaged from the recess and the blowout preventer assembly can be removed. The upper end of the intermediate easing string can be cut within the wellhead and a slips hanger can be installed in the wellhead. The blowout preventer assembly can be returned to the hub and the locking elements can be engaged with the recess.

BRIEF DESCRIPTION OF THE DRAWINGS

Some of the features and benefits of the present invention having been stated, others will become apparent as the description proceeds when taken in compaction with the accompanying drawings, in which.

DETAILED DESCRIPTION OF THE DISCLOSURE

Figure 1:
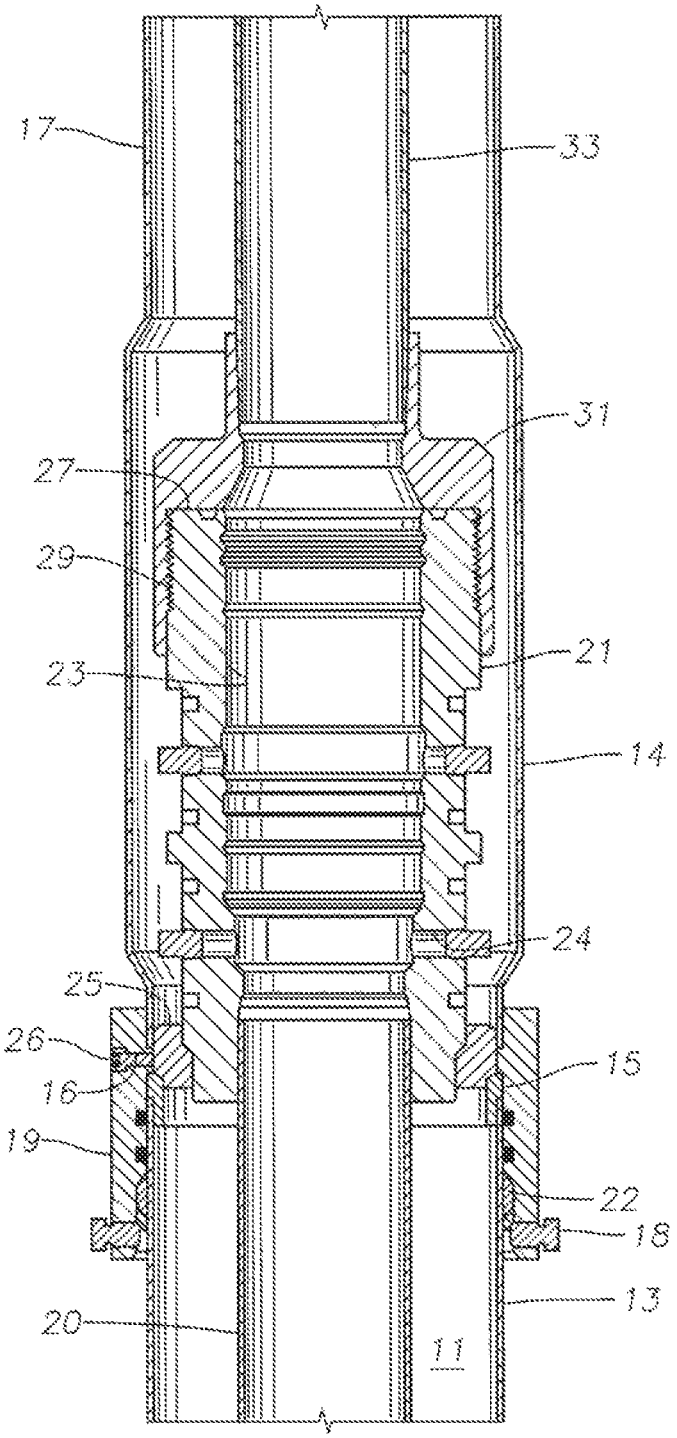
FIG. 1 is a sectional view illustrating running a multi-bowl wellhead through a riser in accordance with an embodiment of this disclosure.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will folly convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, well 11 has a larger diameter conductor pipe 13 extending to a first depth. A landing ring 15 is secured or placed on an upper end of conductor pipe 13. A riser 17 has a riser connector 19 that secures around the upper end of conductor pipe 13. Riser 17 can have a lower portion 14 at its lower end with an enlarged diameter. Riser 17 is not a subsea riser; rather it is a conduit leading from conductor pipe 13 upward to a drilling fluid diverter (not shown) for conveying returning drilling fluid to equipment for cleaning and recycling.

Riser connector 19 is a tubular member that is fastened to a lower end of riser 17, such as by welding. Riser connector 19 has radially extending threaded energizing members 18 spaced around a lower portion. Energizing members 18 are in engagement with slips or wedges 22 carried by riser connector 19. Riser connector 19 also has a view port 16 extending through its side wall a short distance below the lower end of riser 17. A threaded plug 26 selectively closes and seals view port 16. As riser 17 is lowered onto conductor pipe 13, a lower part of riser connector 19 slides over conductor pipe 13. Threaded energizing members 18 are then screwed in to energize slips 22 to grip the exterior of conductor pipe 13. The operator drills well 11 through riser 17 and conductor pipe 13 to a second depth, with drilling fluid and cuttings returning up riser 17.

After reaching the second depth, the operator runs a string of surface casing 20 and attaches the upper end of surface casing 20 to a wellhead 21. Wellhead 21 is a tubular member having a bore 23 and a number of valve ports 24 extending front bore 23 to the exterior of the wellhead 21. Wellhead 21 has a [spilt] *split* support ring 25 at its lower end that lands on landing ring 15. Landing ring 15 acts as a base to support wellhead 21. When landed, wellhead 21 sits within the lower portion 14 of riser 17. Support ring 25 and wellhead 21 can have vertically extending flow by slots to allow for the return flow of cement through the slots and around the wellhead by way of the expanded diameter of lower portion 14 of riser 17 during cementing. Wellhead 21 has an upper rim 27 and a set of external threads 29 on its exterior side wall that extend downward from rim 27.

A running tool 31 has internal threads that secure to external threads 29. A running conduit or landing joint 33 secures to running tool 31 to lower wellhead 21 and surface casing 20 through riser 17. Alter landing wellhead 21, the operator opens view port 16 to visually determine whether wellhead 21 has properly landed on landing ring 15. If properly landed, view port 16 will be aligned with support ring 25 when support ring 25 has landed on landing ring 15. Prior to running wellhead 21 into riser 17, the operator may apply a circumferential paint strip to support ring 25 that will align with view port 16 to assist in determining that support ring 25 has landed on landing ring 15. After visually confirming support ring 25 has properly landed on landing ring 15, the operator closes view port 16 with plug 26, then cements surface casing 20. After cementing surface casing 20, the operator removes running tool 31 and riser 17. Optionally, riser 17 can be removed before running wellhead 21 and surface casing 20. In such an embodiment surface casing 20 and wellhead 21 are not lowered through riser 17.

Figure 2:
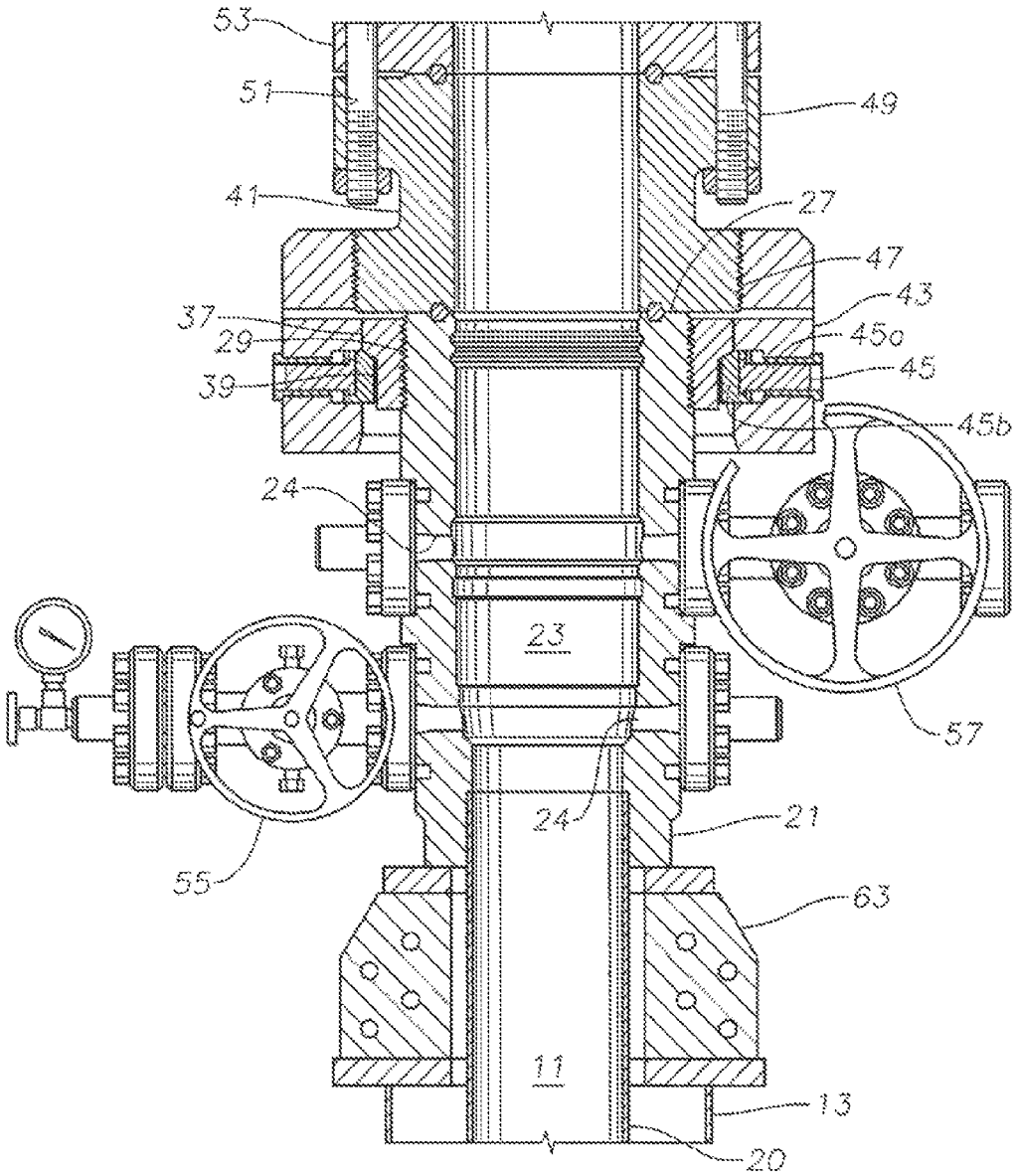
FIG. 2 is a sectional view of the wellhead of FIG. 1, shown with the wellhead landed and a BOP connected in accordance with one embodiment.

Referring to FIG. 2, the operator attaches a hub 37 to external threads 29 on wellhead 21. Hub 37 is a ring with infernal threads that mate with external threads 29 and an external circumferential stepped recess 39 on its outer diameter. A quick connector spool 41 lands on rim 27 of wellhead 21 and has an annular locking member 43 that skirts hub 37. Locking member 43 has a number of dogs or locking elements 45 spaced around its circumference. Dogs 45 can be threaded pins 45a with inner wedge-shaped engaging elements 45b mounted on the inner ends of pins 45a. Recess 39 is shown with a single downward facing sloped surface but can alternatively have more than one stepped surface or a series of teeth, forming a circumferential profile that mates with a corresponding profile on engaging elements 45b of each dog 45. Engaging members 45b do not rotate, but move inward and enter recess 39 when the threaded pins 45a are rotated. In such an embodiment, each dog 45 has an outer end with a profile for receiving a fool (not shown) for rotating dogs 45. Dogs 45 may alternatively engage recess 39 by other conventional means that will move dogs 45 inward. Locking member 43 may be secured to quick connector spool 41 by threads 47 or other means.

Quick connector spool 41 has on its upper end an external flange 49 having a number of bolt holes 51 for receiving bolts to attach quick connector spool 41 to a blowout preventer ("BOP") 53. Normally, lock member 43 will be secured to quick connector spool 41 and quick connector spool 41 will be bolted to BOP 53 prior to lowering the assembly onto wellhead 21. The assembly of BOP 53, quick connector spool 41 and lock member 43 can be quickly attached to hub 37 with dogs 45. The operator may also install wing valves 55, 57 to valve ports 24 at this time. FIG. 2 illustrates a different base 63 than FIG. 1 located at the upper end of conductor pipe 13. Base 63 is typically used if wellhead 21 is run without a riser 11 rather than through riser 17 as shown in FIG. 1.

Figure 3:
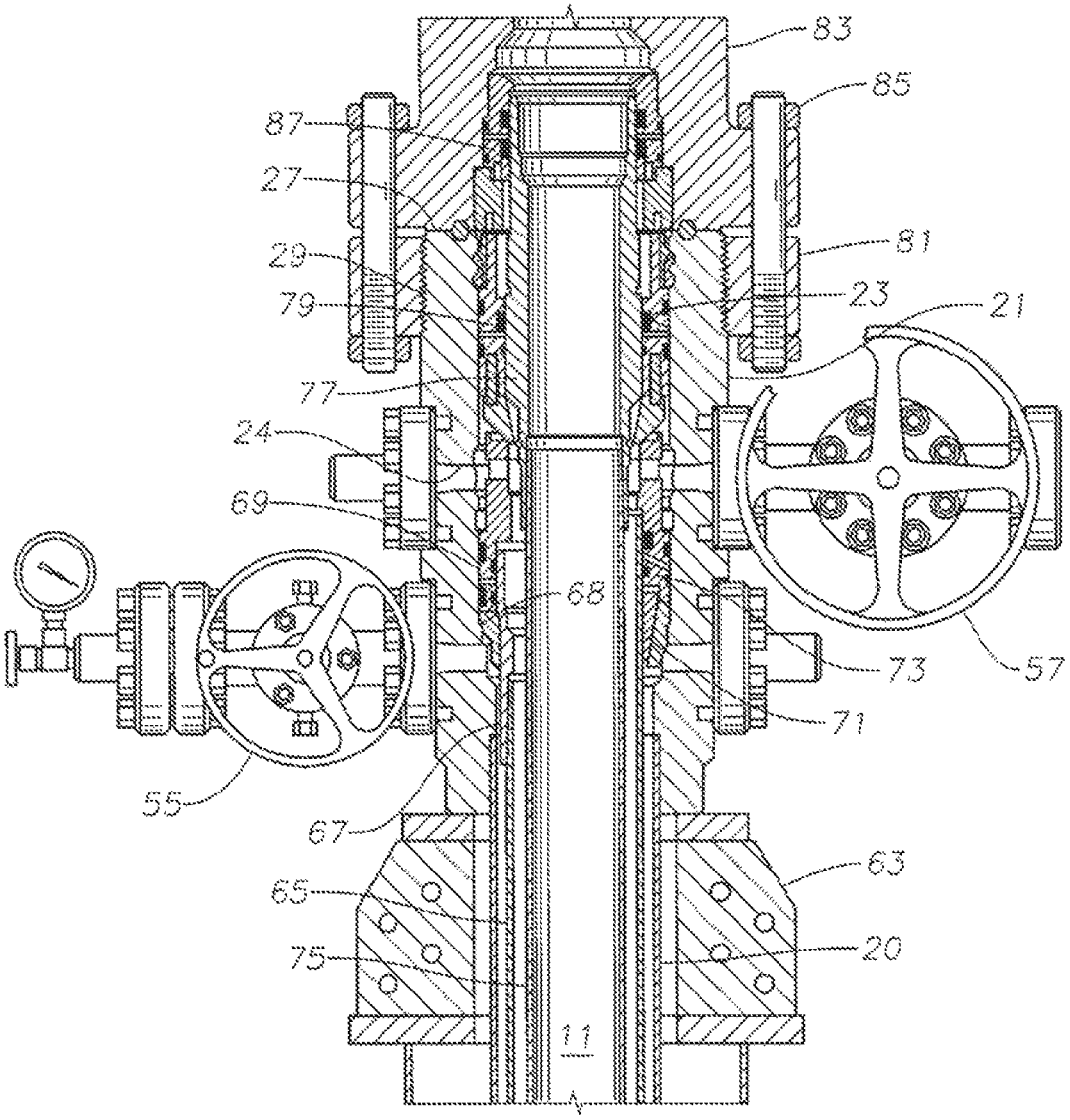
FIG. 3 is a sectional view of the wellhead of FIG. 1, with casing installed in accordance with two different hanger mechanisms, one shown on the left and the other on the right, and a tubing head installed.

The operator then drills through BOP 53 and wellhead 21 to a greater depth and runs at least one more-string of casing. In the example of FIG. 3, the operator has drilled to a depth greater bran surface casing 20 and cemented an intermediate casing suing 65. FIG. 3 shows two examples of hanger mechanisms. On the left side, a mandrel hanger 67 secures by threads to the upper end of intermediate casing string 65. Mandrel hanger 67 lauds on a load shoulder 68 in wellhead 21. A packoff 69 seals between mandrel hanger 67 and the inner wall of wellhead 21. As illustrated on the right side of the drawing, a slips type hanger 71 may be employed to grip the exterior of intermediate easing string 65 in lieu of mandrel hanger 67. A packoff 73 seals between intermediate easing string 65 and the interior wall of wellhead 21.

Slips hanger 71 is more commonly used when the intermediate casing string 65 becomes stuck and mandrel hanger 67 cannot reach load shoulder 68. When that occurs, the operator cuts off the upper portion of intermediate casing string 65 at a selected point within wellhead 21, then installs slips hanger 71. In order to cut off intermediate casing string 65, the operator removes BOP 53 and quick connector spool 41 by retracting dogs 45. After cutting the upper portion of the intermediate casing string 65 and installing slips hanger 71, the assembly of BOP 53, quick connector spool 41 and lock member 43 is re-attached to hub 37 with dogs 45. There is no need to undo and remake a threaded connection or to unbolt BOP 53 from quick connector spool 41 and re-bolt it, thus saving time to provide access for cutting off intermediate casing string 65 when stuck.

In FIG. 3, after cementing intermediate easing string 65 and installing packoff 69 or 73, the operator drills to a final depth and runs a production easing suing 75. A production casing hanger 77 for production casing string 75 is supported on the upper end of the assembly of packoff 69 or 73. A production casing packoff 79 seals between production casing hanger 77 and wellhead 21.

As can be seen in FIG. 3, after running casing strings 65 and 75, BOP 53 is removed along with quick connector spool 41, locking member 43 and hub 37 (FIG. 2). A threaded flange 81 with internal threads secures to external threads 29 on wellhead 21. A subsequent wellhead member, such as a tubing head 83 can then be landed on wellhead 21 and secured to flange 81 with bolts 85. A packoff 87 seals between an upper portion of production easing hanger 77 and an inner surface of tubing head 83. Subsequently, the operator may run a string of production tubing (not shown) through production casing hanger 77 and support the upper end of the tubing string with a tubing hanger in tubing head 83. As shown in FIG. 3, valve 55 is in communication with the annulus between surface easing string 20 and intermediate easing string 65. Valve 57 is in communication with the annulus between intermediate casing string 65 and production casing string 75.

As an alternate to the embodiment shown in FIG. 3, the operator may choose to run only a single string of casing. For example, the operator may eliminate intermediate casing string 65 and just install production casing string 75. If so, a tubular spacer (not shown) would attach to a lower end of production easing hanger 77 and land in wellhead 21. The spacer would laud on load shoulder 68 in wellhead housing 21. Alternately, production easing hanger 77 could land on load shoulder 68 with the spacer positioned on top of the easing hanger.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. A method of completing a well, comprising:

(a) extending a conductor pipe into the well and connecting a riser to an upper end of the conductor pipe with a riser connector, the riser connector sealingly engaging an outer diameter of the conductor pipe and then lowering a wellhead onto a base at an upper end of the well, the wellhead having external threads on an outer diameter, *the riser connector comprising a slip and an energizing member configured to engage the slip to grip the outer diameter of the conductor pipe*;

(b) providing a hub with internal threads and an external circumferential stepped recess, and securing the hub to the external threads of the wellhead;

(c) providing a blowout preventer assembly with an annular locking member having a plurality of locking elements, landing the blowout preventer assembly on the hub, and engaging the locking elements with the recess;

(d) drilling the well through the blowout preventer assembly and restraining at least one hanger within the wellhead with a restraining assembly entirely internal to the wellhead; then (e) removing the blowout preventer assembly and the hub and securing a threaded flange to the external threads of the wellhead, the threaded flange having a plurality of bolt holes spaced around the flange; and (f) bolting a wellhead member to the bolt holes of the threaded flange.

2. The method according to claim 1, wherein the base comprises a landing ring and before lowering the wellhead onto the base, the method further comprises securing the landing ring to the upper end of the well.

3. The method according to claim 1, wherein before lowering the wellhead onto the base, the method further comprises providing a running tool with internal threads and securing the running tool to the external threads of the wellhead and wherein lowering the wellhead onto the base comprises lowering the wellhead with the running tool.

4. The method according to claim 1, wherein step (a) further comprises lowering the wellhead through a riser.

5. The method according to claim 1, wherein the wellhead has an upper rim and the blowout preventer assembly has a blow out preventer and a quick connector spool located between the blowout preventer and the annular locking member, and *wherein* landing the blowout preventer assembly on the hub comprises landing the quick connector spool on the upper rim of the wellhead.

6. The method according to claim 1, wherein the blowout preventer assembly has a blow out preventer and a quick connector spool located between the blowout preventer and the annular locking member and step (c) further comprises connecting the blowout preventer to the quick [connect] *connector* spool with bolts before landing the blowout preventer assembly on the hub.

7. The method according to claim 1, wherein the blowout preventer assembly has a blow out preventer and a quick connector spool located between the blowout preventer and the annular locking member and step (c) further comprises bolting the blow out preventer to the quick [connect] *connector* spool and connecting the spool to the annular locking member before landing the blow out preventer assembly on the hub.

8. The method according to claim 1, wherein step (d) further comprises:

running an intermediate casing string through the blowout preventer assembly and into the wellhead, and if an upper end of the intermediate casing string protrudes above the wellhead when the casing string can no longer be lowered into the well:

disengaging the locking elements from the recess and removing the blowout preventer assembly;

cutting the upper end of the intermediate casing string within the wellhead; and returning the blowout preventer assembly to the hub and engaging the locking elements with the recess.

9. A method of completing a well, comprising:

(a) extending a conductor pipe into the well and connecting a riser to an upper end of the conductor pipe with a riser connector, the riser connector sealingly engaging an outer diameter of the conductor pipe and then providing a wellhead with a bore, a rim, and external threads on an outer diameter portion of the wellhead joining the rim, *the riser connector comprising a slip and an energizing member configured to engage the slip to grip the outer diameter of the conductor pipe*;

(b) securing an upper end of a surface casing string to the wellhead, securing a running tool to the external threads, lowering the wellhead onto a base at an upper end of the well, then cementing the surface casing string;

(c) providing a hub with internal threads and an external circumferential stepped recess, removing the running tool, and securing the hub to the external threads;

(d) providing a blowout preventer, *a connector spool,* and an annular locking member having a plurality of locking elements, bolting the blowout preventer to the *connector spool wherein the connector spool is secured to the* annular locking member to define a blowout preventer assembly and landing the blowout preventer assembly on the hub and moving the locking elements inward into engagement with the recess;

(e) drilling the well through the blowout preventer assembly and cementing at least one inner casing string in the well, the at least one inner casing string extending from a hanger within the wellhead, the hanger restrained within the wellhead with a restraining assembly entirely internal to the wellhead; then (f) removing the blowout preventer assembly and the hub and securing a threaded flange having bolt holes to the external threads; and (g) bolting a tubing head to the bolt holes of the threaded flange.

10. The method according to claim 9, wherein step (b) further comprises running the wellhead with the running tool through a riser.

11. The method according to claim 10, wherein step (c) further comprises removing the riser before connecting the hub to the wellhead.

12. The method according to claim 9, wherein the [blowout preventer assembly of step (d) further comprises a] connector spool *is* bolted [between the blowout preventer and] *to* the annular locking member.

13. The method according to claim 9, wherein step (b) further comprises opening a view port in the riser connector and visually confirming that the wellhead has properly landed on the base.

14. The method according to claim 9, wherein before step (a), the method further comprises extending a conductor pipe into the well and connecting a riser to an upper end of the conductor pipe with a riser connector, drilling through the riser, then removing the riser from the upper end of the well, wherein the riser connector sealingly engages an outer diameter of the conductor pipe.

15. The method according to claim 9, wherein the locking elements comprise threaded members and moving the locking elements inward into engagement with the recess comprises rotating the threaded members with a tool.

16. A method of completing a well, comprising:

(a) connecting a riser to an upper end of a conductor pipe extending into the well with a riser connector, the riser connector sealingly engaging an outer diameter of the conductor pipe*, the riser connector comprising a slip and an energizing member configured to engage the slip to grip the outer diameter of the conductor pipe*;

(b) providing a wellhead with a support ring at its lower end and lowering the wellhead through the riser, the wellhead having external threads on an outer diameter;

(c) landing the support ring of the wellhead on a landing ring located at an upper end of the conductor pipe;

(d) removing the riser;

(e) providing a hub with internal threads and an external circumferential stepped recess, and securing the hub to the external threads of the wellhead;

([e] *f*) providing a blowout preventer, a connector spool, and an annular locking member having a plurality of locking elements, bolting the blowout preventer to one end of the connector spool and connecting the annular locking member to an opposite end of the connector spool, defining a blowout preventer assembly, then landing the blowout preventer assembly on the hub, and engaging the locking elements with the recess;

([f] *g*) drilling the well through the blowout preventer assembly and restraining at least one hanger within the wellhead with a restraining assembly entirely internal to the wellhead; then ([e] *h*) removing the blowout preventer assembly and the hub and securing a threaded flange having bolt holes to the external threads of the wellhead; and ([f] *i*) bolting a wellhead member to the bolt holes of the threaded flange.

17. The method according to claim 16, wherein step (c) further comprises opening a view port in the riser connector and visually confirming that the support ring has properly landed on the landing ring.

18. The method according to claim 16, wherein step (b) further comprises providing a running tool with internal threads and securing the running tool to the external threads of the wellhead and wherein lowering the wellhead through the riser comprises lowering the wellhead with the running tool.

19. The method according to claim 16, wherein step (b) further comprises providing a running tool with internal threads and securing the running tool to the external threads of the wellhead and step (d) further comprises removing the running tool.

20. The method according to claim 16, wherein step ([f] *g*) further comprises:

running an intermediate casing string through the blowout preventer assembly and into the wellhead, and if an upper end of the intermediate casing string protrudes above the wellhead when the casing string can no longer be lowered into the well:

disengaging the locking elements from the recess and removing the blowout preventer assembly;

cutting the upper end of the intermediate casing string within the wellhead;

installing a slips hanger in the wellhead; and returning the blowout preventer assembly to the hub and engaging the locking elements with the recess.

21. A method of completing a well, comprising:

(a) extending a conductor pipe into the well and connecting a riser to an upper end of the conductor pipe with a riser connector wherein the riser connector sealingly engages an outer diameter of the conductor pipe, drilling through the riser and then providing a wellhead with a bore, a rim, and external threads on an outer diameter portion of the wellhead joining the rim*, the riser connector comprising a slip and an energizing member configured to engage the slip to grip the outer diameter of the conductor pipe*;

(b) securing an upper end of a surface casing string to the wellhead, securing a running tool to the external threads, lowering the wellhead onto a base at an upper end of the well, then cementing the surface casing string and removing the riser from the upper end of the well;

(c) providing a hub with internal threads and an external circumferential stepped recess, removing the running tool, and securing the hub to the external threads;

(d) providing a blowout preventer*, a connector spool,* and an annular locking member having a plurality of locking elements, bolting the blowout preventer to the *connector spool wherein the connector spool is secured to the* annular locking member to define a blowout preventer assembly and landing the blowout preventer assembly on the hub and moving the locking elements inward into engagement with the recess;

(e) drilling the well through the blowout preventer assembly and cementing at least one inner casing string in the well, the at least one inner casing string extending from a hanger within the wellhead, the hanger restrained within the wellhead with a restraining assembly entirely internal to the wellhead; then (f) removing the blowout preventer assembly and the hub and securing a threaded flange having bolt holes to the external threads; and (g) bolting a tubing head to the bolt holes of the threaded flange.

*22. A system for coupling components to a wellhead coupled to a casing extending into a downhole formation, the casing being arranged within a conductor pipe that extends into the downhole formation, the system comprising:*

*a top end of the wellhead comprising external threads;*

*a removable hub extending radially outward from the wellhead and configured to selectively engage the external threads on the top end of the wellhead, said removable hub comprising:*

*an external downward facing sloped surface and adjacent axial surface, both surfaces combining to form a recess;*

*an annular locking member comprising a plurality of locking elements configured to move radially inward to engage the external downward facing sloped surface of the recess, wherein each of the plurality of locking elements comprises a pin and a wedge-shaped engaging element, the wedge-shaped engaging element configured to mate to the recess, and the pin is threaded and rotatable relative to the wedge-shaped engaging element, and the wedge-shaped engaging element is configured to move inward and enter the recess when the pin is rotated; and*

*a flange configured to selectively engage the external threads on the top end of the wellhead.*

*23. The system of claim 22, further comprising a spool, the annular locking member being coupled to the spool.*

*24. The system of claim 22, wherein the plurality of locking elements do not rotate when driven radially inward.*

*25. The system of claim 22, wherein the flange is adapted to threadingly couple to a top end of the wellhead.*

*26. The system of claim 22, wherein the annular locking member has a first inner diameter larger than a diameter of the hub and the plurality of locking elements move to a second inner diameter of the annular locking member that is less than the first inner diameter when the plurality of locking elements engage the recess.*

*27. The system of claim 22, wherein the wellhead is a multi-bowl wellhead, the multi-bowl wellhead adapted to receive an intermediate casing string positioned radially inward from the conductor pipe.*

*28. A method for performing operations at a well site including a wellbore, a conductor pipe arranged in a downhole formation, and a casing extending through the conductor pipe to a surface location with a connector, the connector sealingly engaged to an outer diameter of the conductor pipe, the riser connector comprising a slip and an energizing member configured to grip the slip to engage the outer diameter of the conductor pipe, the method comprising:*

*connecting a riser to an upper end of the conductor pipe with a riser connector, the riser connector sealingly engaging an outer diameter of the conductor pipe;*

*coupling a hub to a wellhead coupled to the casing; the hub having internal threads that engage external threads of the wellhead;*

*landing a blowout preventer assembly on the wellhead;*

*engaging the hub with an annular locking member of the blowout preventer assembly; the annular locking member including a plurality of locking elements configured to move radially inward to contact the hub; wherein a bottom surface of the blowout preventer assembly directly contacts a rim of the wellhead after the annular locking member engages the hub;*

*removing the hub from the wellhead; and*

*coupling a flange to the wellhead; the flange having internal threads that engage the external threads of the wellhead.*

*29. The method of claim 28, further comprising:*

*drilling a well through the blowout preventer assembly and restraining at least one hanger within the wellhead with a restraining assembly entirely internal to the wellhead.*

*30. The method of claim 28, wherein the plurality of locking elements do not rotate when moved radially inward to contact the hub.*

*31. A system for conducting operations at a well site, the system comprising:*

*a flange having internal threads that engage the external threads of the wellhead;*

*a hub having internal threads configured to mate with external threads of a multi-bowl wellhead such that, upon engagement of the internal threads with the external threads, the hub is threadingly coupled to the multi-bowl wellhead, the hub further comprising a recess formed along an outer profile of the hub;*

*a blowout preventer assembly comprising a blowout preventer, an annular locking member, and a quick connector spool; and*

*the annular locking member configured with respect to the blowout preventer such that upon engaging the blowout preventer assembly with the hub, the annular locking member extends axially lower than the blowout preventer, the annular locking member including a plurality of locking elements configured to move radially inward to engage the recess, thereby coupling the annular locking member to the hub, and wherein a mating face of the blowout preventer assembly contacts the multi-bowl wellhead when the annular locking member is coupled to the hub, wherein each of the plurality of locking elements comprises a pin and a wedge-shaped engaging element, the wedge-shaped engaging element configured to mate to the recess, and the pin is threaded and rotatable relative to the wedge-shaped engaging element, and the wedge-shaped engaging element is configured to move inward and enter the recess when the pin is rotated.*

*32. The wellbore system of claim 31, wherein a casing string is configured to be installed into the multi-bowl wellhead through a bore of the blowout preventer.*

*33. The system of claim 31, wherein the plurality of locking elements do not rotate when driven radially inward.*

*34. The system of claim 22, wherein a top of the hub is axially lower than a rim of the wellhead.*

*35. The system of claim 22, wherein the annular locking member defines an internal thread.*

*36. The method according to claim 1, wherein the energizing member is threaded.*

*37. The method according to claim 1, further comprising sliding the energizing member of the riser connector over the conductor pipe.*

* * * * *